Patented Oct. 12, 1937

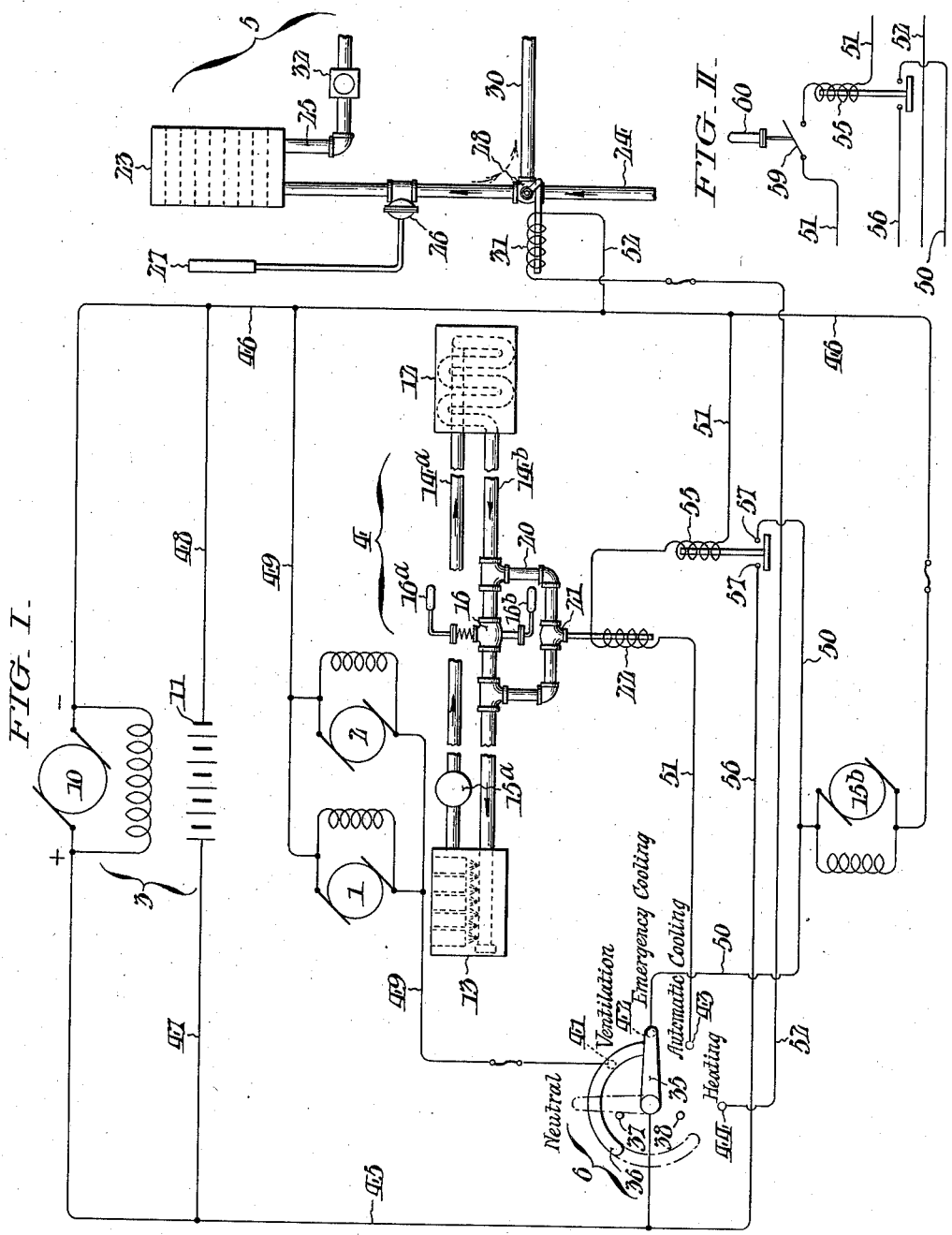

2,095,881

UNITED STATES PATENT OFFICE 2,095,881

CONTROL FOR AN AIR CONDITIONING SYSTEM

William J. Madden, Lansdowne, Pa., assignor to The Pennsylvania Railroad Company, Philadelphia, Pa., a corporation of Pennsylvania Application July 9, 1936, Serial No. 89,801

3 Claims. (Cl. 257—3)

This invention relates generally to apparatus for controlling air conditioning systems, and is particularly adapted for use in connection with the air conditioning equipment of railway cars.

Heretofore in the air conditioning of railway cars, the difficulty has been experienced that the trainman in attendance has been required to manipulate a series of switches or other instrumentalities for controlling the system so that it functions with maximum comfort to the passengers under varying weather conditions, and such control switches have had to be manipulated intelligently and in the proper order to produce ventilation, or the proper degree of cooling or heating. In many cases, the control systems are so complicated that a thorough understanding is required of the trainman as to the particular air conditioning system employed on the car attended by him.

Obviously the other duties of a trainman in attendance upon an air conditioned car may be seriously impaired or delayed if it is necessary for him to stop and read directions, or make a study of the control apparatus, to ascertain how the particular system on the car is to be operated. This difficulty is greatly accentuated where a trainman attends a number of cars in a train, and where different cars are equipped with different types of air conditioning systems and different types of controls for operating the same.

Accordingly, the principal object of my invention is to overcome the above recited difficulties by the provision of a simple, reliable, economical, and comprehensive, control system for air conditioning a railway car or other enclosure in which people assemble. To this end the apparatus of my invention is characterized by the use of a simple and compact master control switch by which full control of all of the functions of the air conditioning equipment is at the disposal of the attendant. In order that the attendant may see at a glance how the master control switch is to be operated to produce such functions as "ventilation", "emergency cooling", "automatic cooling", or "heating", the operating contacts of the switch are desirably labeled with such words, and in this manner the operation of the switch is made immediately apparent.

Other objects and advantages characterizing my present invention will become apparent from the following detailed description of a specific embodiment of my invention, reference being had to the accompanying drawing, whereof:

Fig. I represents a diagrammatic view of control apparatus embodying my invention; and, Fig. II represents a modification of the thermostatic control for the cooling system.

In the drawing, there is shown an example of the invention as applied to the air conditioning equipment of a railway car, but it will be understood that the invention is generally applicable to the air conditioning of any form of enclosure where people assemble, such as the auditorium of a theatre. The apparatus includes an intake blower motor 1, and an exhaust blower motor 2, used for circulating air in the enclosure to be conditioned. It also includes a source of electrical power 3, a cooling unit comprehensively designated at 4, a heating unit comprehensively designated at 5, and a master control switch 6 movable to a series of different positions to effect the desired control of the air conditioning equipment in accordance with the existing weather conditions.

The blower and exhaust fan driven by the motors 1 and 2 may be of any of the many types now in general use, and their particular positioning is not deemed to be pertinent to the invention. The source of electrical power 3 consists of an axle generator 10 and a battery 11 connected in parallel.

The cooling unit 4 is of a conventional type, and details thereof have been omitted for the sake of clarity. It includes an evaporator or surface cooling element designated at 12, refrigerating apparatus 13, which may take the form of an ice compartment or mechanical refrigerating unit, depending upon the particular cooling medium selected, and pipes 14a, 14b, through which the cooling medium circulates from the refrigerating apparatus 13 to the evaporator 12 and returns from the evaporator 12 to the refrigerating apparatus 13. Such circulation of the refrigerating medium is accomplished by means of a pump 15a driven by an electric motor 15b. A valve 16 operated by a modulated differential thermostat is disposed within the pipe 14b and serves to regulate the return flow of the cooling medium, in accordance with the difference between the prevailing inside and outside temperatures. Such a modulated differential thermostat is fully shown and described in Letters Patent No. 1,975,165, granted to me October 2, 1934. The modulated differential thermostat includes an element 16a responsive to outside temperature and an element 16b responsive to inside temperature.

In addition to the automatic control, effected by the thermostat valve 16, emergency control means are provided for the cooling unit which are operated manually and which are designed to take care of situations where it is desired to have the cooling unit operate at full capacity, or where the differential thermostat fails to operate satisfactorily. Such emergency equipment includes a by-pass 20 which surrounds the differential thermostat 16. The by-pass 20 contains a valve 21, actuated by a solenoid 22, which valve is closed when the cooling system is operating under automatic control and is opened when the system is operating under emergency control.

The heating unit 5 is of a conventional type and comprises generally a heater 23, a pipe 24 which conducts steam or other heating medium to the heater, and a pipe 25 through which the heating medium is discharged. A regulating valve 26 is disposed within the supply pipe 24 and is operated by a thermostat 27 desirably placed in the path of the air flowing through the heater 23. A three-way control valve 28 is employed in the pipe 24 for shutting off the circulation of the heating medium. The three-way control valve 28 is actuated by a solenoid 31. When the solenoid 31 is energized, the three-way control valve 28 allows the heating medium to pass through the pipe 24 to the heater 23, and prevents passage of the heating medium to a pipe 30 which leads to the atmosphere. When the solenoid 31 is de-energized, the control valve 28 is moved to a position in which the supply of the heating medium through pipe 24 is shut off, and the heater 23 is allowed to drain to the atmosphere through the pipe 30. Desirably a trap 32 is provided in the discharge pipe 25.

The switch 6 has an arm 35, to which is attached a contact arc 36. In the off or "neutral" position, the arm 35 rests against a stop 37, and in its other extreme or "heating" position, against a stop 38. Contact arc 36 connects directly with operating contact 41 only, and this contact is preserved as the arm 35 engages the other contacts 42, 43 and 44, on rotation. These contacts 42, 43 and 44 are positioned on an arc outside the arc 36 so that there is no contemporaneous contact of arc 36 with any of contacts 42, 43 and 44. The positive side of the generator 10 is connected to the switch arm 35 by wire 45, and the contacts 41, 42, 43 and 44 all connect ultimately to a wire 46 running to the negative side of the generator 10. The battery 11 is connected in parallel with the generator 10 by wires 47 and 48. Wire 49 connects contact 41 to wire 46, including the blower and exhaust motors 1 and 2 in parallel with each other. Wire 50 connects contact 42 with wire 46, including pump motor 15b in the circuit. Wire 51 connects contact 43 with wire 46, including solenoid 22 and a relay 55. This relay 55, when energized, closes the circuit from the source of power 3, through wire 45, wire 56, including contacts 57 engaged when the relay 55 is energized, pump 15b and wire 46. Wire 52 connects contact 44 to wire 46, including solenoid 31 in the circuit.

The operation of the equipment hereinbefore described is as follows. In the off or "neutral" position of the master control switch 6, there is no air conditioning or ventilation of any sort and no losses from the source of power 3. If ventilation only is desired, the master control switch 6 is rotated until contact 41, marked "Ventilation", makes connection with arc 36 on arm 35. The blower and exhaust fan motors 1 and 2 at once start to operate, the current flowing from source of power 3, through wire 45, arm 35, arc 36, wire 49 with motors 1 and 2 connected in parallel, and through wire 46 back to source 3.

If it becomes necessary, as an emergency measure, to reduce the temperature of the air conditioned space, the master control switch 6 is moved to "emergency cooling", in which position the arm 35 engages contact 42, arc 36 continuing its connection with contact 41 to operate the blower and exhaust fan motors 1 and 2. This starts the pump motor 15b, circulating the cooling medium through cooling unit 4 at full capacity, the current flowing from source 3, through wire 45, switch 6, wire 50 including pump motor 15b, and thence back to source 3 by wire 46. When the enclosure has been sufficiently cooled, the operator returns the master control switch to "neutral" position.

If it is desired to effect cooling under thermostatic control, the operator moves the master control switch to the contact marked "Automatic cooling". When the switch arm 35 is thus moved to contact 43, it breaks the circuit last described, but does not interrupt the blower circuit. A circuit is now set up from source 3, through wire 45, switch 6, wire 51 including solenoid 22 and relay 55, and thence by wire 46 back to source 3. The energization of relay 55 causes the pump motor 15b to operate through a circuit leading from source 3, over wire 45, wire 56 including switch 57 and pump 15a, and thence back to source 3. The energization of solenoid 22 closes valve 21, subjecting the circulation of the cooling medium to the automatic regulation of modulated differential thermostat valve 16 according to the difference in temperature between the outside air and the air in the air conditioned space.

Finally, let it be assumed that the air conditioned space is too cold and that heating is desired. The arm 35 of the master control switch 6 is then rotated to contact 44, marked "Heating" and the cooling equipment is rendered inoperative. Current flows from source 3, through wire 45, switch 6, wire 52 including solenoid 31, and thence back to source 3, over wire 46. The energization of solenoid 31 opens valve 28 so far as pipe 24 is concerned, and closes the connection between drain pipe 30 and pipe 24. The heating medium now circulates through heating unit 23 and the air conditioned space is heated under the regulation of thermostat 27 which controls valve 26.

In Fig. II of the drawing, there is illustrated a modification of the invention wherein an "on and off" thermostatic control is used in lieu of the modulated differential control accomplished by the valve 16. The modified apparatus involves a switch 59, in wire 51, which serves to open and close the circuit to the relay 55 in accordance with the action of a thermostat 60. With such a system the pump motor 15b is stopped and started and no regulating valve is required in the line through which the cooling medium is circulated.

It is clear that this air conditioning control is simple and comprehensive. The control of a number of air conditioned cars is easily accomplished by one trainman as he passes through the train from time to time. While I have described a specific embodiment of my invention in some detail, it is obvious to one skilled in the art that variations and changes may be made without departing from the spirit of my invention as hereinafter claimed.

Having thus described my invention, I claim:

1. In an air conditioning system, ventilating means whereby air is circulated in the enclosure to be conditioned, automatic cooling means whereby a cooling medium is circulated in heat exchange relation with said air with variable cooling effect under thermostatic control, emergency cooling means whereby said cooling medium is circulated with constant cooling effect, heating means thermostatically controlled whereby a heating medium is circulated in heat exchange relation with said air, and a master control switch movable to a series of different positions, said master control switch in one position serving to operate said ventilating means exclusively, in another position to operate said ventilating and automatic cooling means exclusively, in another position to operate said ventilating and emergency cooling means exclusively, and in another position to operate said ventilating and automatic heating means exclusively.

2. In an air conditioning system, a blower for circulating air in the enclosure to be conditioned, cooling means whereby a cooling medium is circulated in heat exchange relation with said air, heating means whereby a heating medium is circulated in heat exchange relation with said air, a thermostat for controlling said cooling means and varying the effect thereof, means for cutting out said thermostatic control whereby the full effect of said cooling means is obtained, and a master control switch having a series of operating contacts for the following functions: to operate said blower alone, to operate said blower in conjunction with said cooling means under thermostatic control, to operate said blower in conjunction with said cooling means at full effect, to operate said blower in conjunction with said heating means, and to render said blower and said heating and cooling means inoperative.

3. In an air conditioning system, a blower for circulating air in the enclosure to be conditioned, means for circulating a cooling medium in heat exchange relation with said air, means for circulating a heating medium in heat exchange relation with said air, a thermostatically operated valve controlling the circulation of said cooling medium, a by-pass around said valve, an electromagnetically controlled valve in said by-pass, and a master control switch movable to a series of different positions and serving in one position to operate said blower exclusively, in another position to operate said blower and cause the circulation of the cooling medium through said by-pass, in another position to operate said blower and cause the circulation of the cooling medium through said thermostatically operated valve, and in another position to operate said blower and cause the circulation of the heating medium.

WILLIAM J. MADDEN.